United States Patent [19]

Pluess

[11] Patent Number: 4,666,061

[45] Date of Patent: May 19, 1987

[54] MEASURING DEVICE FOR BEVERAGE DISPENSER LINES

[75] Inventor: Heinz Pluess, Buchenweg, Switzerland

[73] Assignee: Digmesa AG Digitale Messtechnik, Biel, Switzerland

[21] Appl. No.: 713,621

[22] Filed: Mar. 19, 1985

[30] Foreign Application Priority Data

Mar. 20, 1984 [DE] Fed. Rep. of Germany ....... 8408445

[51] Int. Cl.$^4$ ............................ B67D 5/20; G01F 1/06
[52] U.S. Cl. ..................................... 222/71; 222/148;
73/861.87; 73/861.19; 285/12
[58] Field of Search ........................... 222/71, 40, 148;
285/12, 33; 73/201, 861.75, 273, 861.87, 861.88,
861.79; 137/614, 271; 416/208; 384/907.1, 227;
220/298; 415/202, 207

[56] References Cited

U.S. PATENT DOCUMENTS

| 2,041,762 | 5/1936 | Hazard et al. | 72/273 |
| 2,111,956 | 3/1938 | Baldwin | 285/33 X |
| 2,257,321 | 9/1941 | Arnold | 285/33 X |
| 2,863,317 | 12/1958 | Rings | 73/201 |
| 3,655,090 | 4/1972 | Rothrock et al. | 220/298 |
| 3,731,534 | 5/1973 | Painley et al. | 73/273 |
| 3,866,469 | 2/1975 | Wemyss | 73/861.87 |
| 4,101,874 | 7/1978 | Denison et al. | 73/861.79 X |
| 4,139,222 | 2/1979 | Loland | 285/12 X |
| 4,271,014 | 6/1981 | Aid et al. | 73/861.75 X |
| 4,345,798 | 8/1982 | Cortés | 384/907.1 X |
| 4,389,902 | 6/1983 | Kataoka et al. | 73/861.87 |
| 4,489,616 | 12/1984 | Priddy | 73/861.79 |
| 4,534,227 | 8/1985 | Petit | 73/861.87 |
| 4,548,084 | 10/1985 | Onoda et al. | 73/861.87 X |

FOREIGN PATENT DOCUMENTS

| 622075 | 3/1981 | Switzerland | 285/12 |
| 887874 | 12/1981 | U.S.S.R. | 285/33 |

Primary Examiner—Joseph J. Rolla
Assistant Examiner—Nils Pedersen
Attorney, Agent, or Firm—Roylance, Abrams, Berdo & Goodman

[57] ABSTRACT

A measuring device for beverage dispenser lines comprises a housing with inlet and discharge ports, first and second attachments, and first and second couplings. The attachments have connectors for securing the attachments to ends of fluid conveying conduits. The first and second couplings are mounted on the first and second attachments, respectively, and the housing, and releasably couple the attachments with the ports of the housing.

11 Claims, 1 Drawing Figure

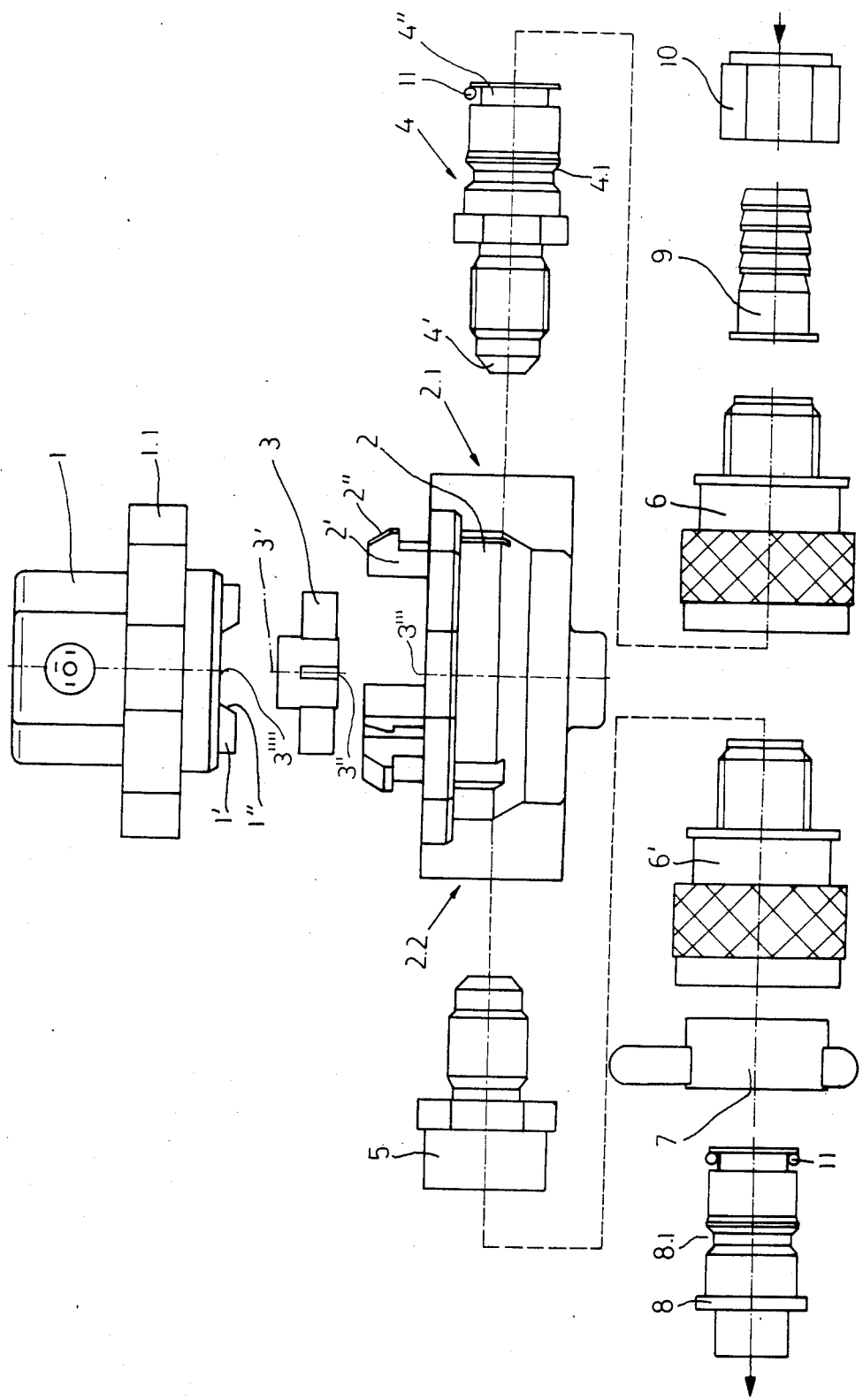

MEASURING DEVICE FOR BEVERAGE DISPENSER LINES

FIELD OF THE INVENTION

The present invention relates to a measuring device to be built into beverage dispenser lines, especially for beer, with a measuring device housing and couplings for lines.

BACKGROUND OF THE INVENTION

Lines used for wine, mineral water and even for beer, include measuring or metering devices, for example flowthrough meters or the like. Generally, the lines and measuring devices must be cleansed at regular intervals. For many beverages, the lines and measuring devices can be simply and quickly cleaned by forcing a cleaning liquid through the lines and measuring devices while they are connected. Thus, the measuring devices need not be disassembled from the lines for such beverages.

Sediments, such as beer yeast sediments, exist in other drinks, especially beer. These sediments must be removed mechanically. For this purpose, small foam pellets must be forced through the line. Such pellets cannot be forced through the measuring device since they are blocked in the device and clog the device. The measuring device must be disassembled to clean the sediments. Disassembly of conventional measuring devices for cleaning is a complicated and costly procedure.

SUMMARY OF THE INVENTION

Objects of the present invention involve providing a measuring device for a beverage dispenser line which can be quickly and simply assembled and disassembled.

The foregoing objects are obtained by a measuring device for beverage dispenser lines, comprising a housing with inlet and discharge ports, first and second attachments, and first and second couplings. The attachments have connectors for securing the attachments to ends of fluid conveying conduits. The first and second couplings are mounted on the first and second attachments, respectively, and the housing, and releasably couple the attachments with the ports of the housing.

The measuring device according to the present invention can be disassembled and reassembled out of the line system in a few seconds.

Preferably, the couplings are complementary. This permits the two lines to be connected rapidly with each other following rapid disassembly of the measuring device housing from the lines for cleaning. Without having the smaller section through the measuring device housing, cleaning can be accomplished by forcing foam pellets through the lines. The couplings can be plug connections or bayonet fasteners.

Connectors are preferably threaded into the measuring device housing. Following removal of the housing from the lines, the housing can be opened in a simple and convenient manner and be cleaned. The reassembly of the housing is simplified and expedited. The measuring device housing has a top part and a bottom part which can be coupled by a bayonet connection.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

The sole drawing FIGURE which forms a part of this disclosure is an exploded side elevational view of a measuring device according to the present invention.

DETAILED DESCRIPTION OF PREFERRED EMBODIMENTS

The measuring device according to the present invention has a measuring device housing comprising a top part 1 and a bottom part 2. A full floating measuring vane 3 is rotatably mounted in the housing, which vane is displaced and rotated by the liquid flowing through bottom part 2 of the measuring device housing. The rotation of measuring vane 3 provides the measurement through an electronic measuring mechanism. Vane 3 is free floating in that it is not mounted on a through shaft.

A diamond point bearing 3''' (illustrated graphically, not shown in detail) on bottom part 2 mates with bearing 3'' on measuring vane 3 and loosely mounts the measuring vane 3 in the bottom part of the measuring device housing. The vane is centered and held in place by the superposed top part 1. Top part 1 has impact fins 1' with inwardly facings bevels 1'' which center and position measuring vane 3 when top part 1 is superposed on bottom part 2. Additionally, vane bearing point 3' is guided into the top diamond bearing 3'''.

Bottom part 2 has hooks 2' adjacent its peripheral edge to lock it securely to top part 1. Hooks 2' have bevels 2'', projecting axially and facing outwardly. Top part 1 is guided by bevels 2'' as hooks 2' enter hollow annular flange 1.1 to center the top part over the hooks, such that top part 1 can be safely and firmly held by rotation of the top part through a small angle relative to hooks 2'. The inner surface of flange 1.1 has correspondingly configured and associated fixation elements to form a bayonet connection with hooks 2'. Top and bottom parts 1, 2 can have an annular packing and a lining on the inside chamber of the housing.

Bottom part 2 of the measuring device housing has an inlet opening or port 2.1 and a discharge opening or port 2.2. The ports are coaxially aligned with each other along an axis perpendicular to the superpositioning of top part 1 on bottom part 2. A transition member 4 with a nozzle nipple 4' is threadedly connected to the inlet opening. Nipple 4' is threaded into the inlet opening with nipple 4' arranged in front of measuring vane 3. A coupling 6 is superposed over an end 4'' of transition member 4 opposite nozzle nipple 4'. Coupling 6 is detachably coupled to transition member 4 by a plug connection at one end of the coupling. At the opposite end of coupling 6, coupling 6 is tightly connected by a tubing member 9 to a tube. The tube is forced onto tubing member 9. An internally threaded cap 10 presses the tubing member and tube together by screwing cap 10 tightly against coupling 6, tightly connecting the tube to the coupling. The plug connection between transition member 4 and coupling 6 permits these parts to be detached rapidly and conveniently. Alternatively, a bayonet connection can be provided between transition member 4 and coupling 6.

Another transition member 5 is threaded in a corresponding manner into the discharge port 2.2 of housing bottom part 2, and is connected with another coupling 6', identical to the coupling 6. Coupling 6' is similarly connected by a "quick disconnect" connection with an attachment member 8, e.g. by a plug connection or a bayonet connection, and is simply detachable. Attachment member 8 can be attached by a clamping nut 7 to a keg of draft beer or to corresponding connection members of a keg of draft beer. The plug connections between transition member 4 and coupling 6, and between coupling 6' and attachment member 8 are known. Couplings 6 and 6' have balls biased by springs. The balls are forced into and retained in conical grooves 4.1 and 8.1 of members 4 and 8, respectively. The grooves are conical in section. The conical configuration of the grooves presses couplings 6 and 6' tightly against O-rings 11 mounted on members 4 and 8 forming a reliable, sealed connection therebetween. The O-rings 11 are mounted on the outer periphery of members 4 and 8, not inside couplings 6 and 6', such that the rings can be easily removed and cleaned.

The lines, formed at least in part by the tube coupled to tubing member 9, are to be cleaned by disconnecting the plug connections between transition member 4 and coupling 6 and between attachment member 8 and coupling 6', and then removing the measuring device housing from the dispenser line. Coupling 6, connected through tubing member 9 and cap 10 with the tube, is then superposed and coupled directly on attachment member 8, such that the line can be cleaned directly by mechanical penetration of foam pellets. The inside of measuring device housing 1 and 2 can be cleaned by separating housing parts 1 and 2, cleaning the various measuring device parts separately and then reassembling the measuring device as described above. After the line is cleaned, coupling 6 is detached from attachment member 8, and the measuring device housing is reinserted into the line with coupling 6 connected to transition member 4 and coupling 6', mounted on measuring device housing 1 and 2, again connected to attachment member 8.

While various embodiments have been chosen to illustrate the invention, it will be understood by those skilled in the art that various changes and modifications can be made therein without departing from the scope of the invention as defined in the appended claims.

What is claimed is:

1. A measuring device for dispenser lines for sedimentary beverages such as beer, lemonade and the like, comprising:
   a housing with top and bottom parts and with inlet and discharge ports;
   a free floating measuring impeller rotatably mounted in said housing by pointed bearing means, said bearing means including first and second mating bearings on said impeller and said top part, respectively, and third and fourth mating bearings on said impeller and said bottom part, respectively;
   centering means, on said impeller and said housing, for creating forces on said impeller centering said impeller when joining said top and bottom parts of said housing, said centering means including impact fins in said top part with inwardly facing bevels which engage and center said impeller;
   first and second attachments having connector means for securing said attachments to ends of fluid conveying conduits; and
   first and second detachable coupling means on said first and second attachments, respectively, and mating coupling means on said housing for releasably connecting said attachments with said ports of said housing;
   whereby, during assembly, said impeller can be loosely mounted on said bottom part by engaging said third and fourth bearings and then centered by superposing said top part over said bottom part such that said bevels guide said impeller to engage properly said first and second bearings.

2. A measuring device according to claim 1 wherein said first and second coupling means are complimentary permitting direct coupling of said first and second attachments without said housing.

3. A measuring device according to claim 2 wherein said coupling means comprise plug connections.

4. A measuring device according to claim 2 wherein said coupling means comprise bayonet connections.

5. A measuring device according to claim 1 wherein said coupling means comprise bayonet connections.

6. A measuring device according to claim 1 wherein said coupling means comprise plug connections.

7. A measuring device according to claim 1 wherein one end of each of said couplings means is threaded into said housing.

8. A measuring device according to claim 1 wherein said bottom part comprises axially projecting catches with outwardly facing bevels, said bevels on said catches engaging an interior surface of a flange on said top part to center said top part relative to said bottom part.

9. A measuring device according to claim 8 wherein said catches and said flange form a bayonet coupling.

10. A measuring device according to claim 1 wherein said bottom part comprises axially projecting catches with outwardly facing bevels, said bevels on said catches engaging an interior surface of a flange on said top part to center said top part relative to said bottom part.

11. A measuring device according to claim 1 wherein said top and bottom parts are releasably coupled by a bayonet coupling.

* * * * *